US012807185B2

(12) United States Patent
Lee

(10) Patent No.: US 12,807,185 B2
(45) Date of Patent: Nov. 24, 2026

(54) METHOD FOR DETERMINING WHETHER AUTONOMOUS VEHICLE CAN TRAVERSE AT INTERSECTION IN PARKING LOT

(71) Applicants: Hyundai Motor Company, Seoul (KR); Kia Corporation, Seoul (KR)

(72) Inventor: Yeong Ho Lee, Pohang-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 79 days.

(21) Appl. No.: 18/910,102

(22) Filed: Oct. 9, 2024

(65) Prior Publication Data

US 2025/0178639 A1 Jun. 5, 2025

(30) Foreign Application Priority Data

Dec. 4, 2023 (KR) ........................ 10-2023-0172976

(51) Int. Cl.
*B60W 60/00* (2020.01)

(52) U.S. Cl.
CPC . *B60W 60/0015* (2020.02); *B60W 2554/4041* (2020.02); *B60W 2554/4042* (2020.02)

(58) Field of Classification Search
None
See application file for complete search history.

(56) References Cited

U.S. PATENT DOCUMENTS

| | | | | |
|---|---|---|---|---|
| 2016/0161271 | A1 | 6/2016 | Okumura | |
| 2019/0118801 | A1 | 4/2019 | Noh et al. | |
| 2020/0026277 | A1 | 1/2020 | Palanisamy et al. | |
| 2020/0086859 | A1* | 3/2020 | McGill, Jr. | B60W 10/04 |
| 2022/0410882 | A1* | 12/2022 | Bush | B60W 30/0956 |
| 2023/0084578 | A1* | 3/2023 | Sadeghi | B60W 60/0011 701/23 |
| 2024/0217510 | A1 | 7/2024 | Gutmann et al. | |

FOREIGN PATENT DOCUMENTS

| | | | | |
|---|---|---|---|---|
| KR | 10-2017-0018414 A | | 2/2017 | |
| KR | 10-2019-0045554 A | | 5/2019 | |
| WO | WO-2022147382 A2 | * | 7/2022 | G08G 1/165 |

* cited by examiner

*Primary Examiner* — Shayne M. Gilbertson
(74) *Attorney, Agent, or Firm* — Morgan, Lewis & Bockius LLP

(57) ABSTRACT

A method of determining whether an autonomous vehicle is allowed to traverse at an intersection in a parking lot, includes obtaining, in response to the vehicle approaching the intersection, driving route information of the vehicle and information on a risk group, setting a risk assessment zone within the intersection, deriving an occupancy probability of the risk group, determining a collision risk between the vehicle and the risk group by use of the risk assessment zone and the occupancy probability, and determining, based on the collision risk, whether the vehicle is allowed to traverse the intersection.

15 Claims, 9 Drawing Sheets

METHOD FOR DETERMINING WHETHER AUTONOMOUS VEHICLE CAN TRAVERSE AT INTERSECTION IN PARKING LOT

CROSS-REFERENCE TO RELATED APPLICATION

The present application claims priority to Korean Patent Application No. 10-2023-0172976, filed Dec. 4, 2023, the entire contents of which is incorporated herein for all purposes by this reference.

BACKGROUND OF THE PRESENT DISCLOSURE

Field of the Present Disclosure

The present disclosure relates to a method of determining whether an autonomous vehicle is allowed to traverse at an intersection in a parking lot.

Description of Related Art

The statements in the present section merely provide background information related to the present disclosure and do not necessarily form related art.

An autonomous vehicle (AV) can perform remotely controlled autonomous parking functions by following a memorized driving route for parking or a designated route within a parking lot.

Meanwhile, since parking lots contain a large number of vehicles crowded in a limited space, roads within the parking lot are typically grid-shaped with multiple intersections. Therefore, it is practically difficult for an autonomous vehicle to simply drive over route points at a constant speed, and the autonomous vehicle needs to perform behavioral control by taking account of surrounding dynamic/static obstacles and traffic flow at every moment.

When an autonomous vehicle drives without considering its surroundings at intersections in parking lots lacking a traffic signal system, it may collide with other vehicles driving straight ahead, turning left or right, or with unexpected pedestrians. To avoid the present risk of collision, the autonomous vehicle needs to explore yielding driving strategies such as slowing down when entering an intersection in a parking lot, or stop-and-go driving. For example, when the vehicle attempting to turn or traverse at an intersection in the parking lot detects a dynamic obstacle approaching the intersection from a sideways direction, as shown in FIG. 1A, the vehicle may be controlled to stop before entering the intersection considering the risk of collision with the dynamic obstacle and drive after being relieved of the risk, as shown in FIG. 1B.

Considering the characteristics of parking lots where there is no traffic signal system such as traffic lights and no designated driving direction on the road, there is a need to provide an appropriate method of determining whether the intersection is clear for the entering autonomous vehicle to traverse by utilizing information on for example, the predicted travel location of the autonomous vehicle, the predicted travel time, and the surrounding dynamic/static obstacles.

The information included in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing a method of determining whether an intersection in a parking lot is traversable by use of a probability model-based collision risk assessment.

The purposes of the present disclosure are not limited to those mentioned above, and other purposes not mentioned herein will be clearly understood by those skilled in the art from the following description.

According to at least an exemplary embodiment of the present disclosure, the present disclosure provides a method of assessing a risk of collision for traversing an intersection by an autonomous vehicle including obtaining, in response to the vehicle approaching the intersection, driving route information of the vehicle and information on a risk group, setting a risk assessment zone within the intersection, deriving an occupancy probability of the risk group, calculating a collision risk between the vehicle and the risk group by use of the risk assessment zone and the occupancy probability, and determining, based on the collision risk, whether the vehicle is allowed to traverse the intersection.

According to another exemplary embodiment of the present disclosure, the present disclosure provides a computing device including at least one processor and a memory operatively coupled to at least one processor, wherein the memory stores instructions that cause at least one processor to perform operations in response to an execution of the instructions by the at least one processor. Here, the operations include obtaining, in response to the vehicle approaching the intersection, driving route information of the vehicle and information on a risk group, setting a risk assessment zone within the intersection, deriving an occupancy probability of the risk group, calculating a collision risk between the vehicle and the risk group by use of the risk assessment zone and the occupancy probability, and determining, based on the collision risk, whether the vehicle is allowed to traverse the intersection.

According to various exemplary embodiments of the present disclosure, it is possible to determine more precisely whether an autonomous vehicle is allowed to traverse an intersection in a parking lot.

According to various exemplary embodiments of the present disclosure, it is possible to assess the risk of collision at intersections in a parking lot more accurately even when the sensor data is less reliable.

The effects of the present disclosure are not limited to the effects mentioned above, and other effects not mentioned will be clearly understood by those skilled in the art from the description below.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

Figure 1A:
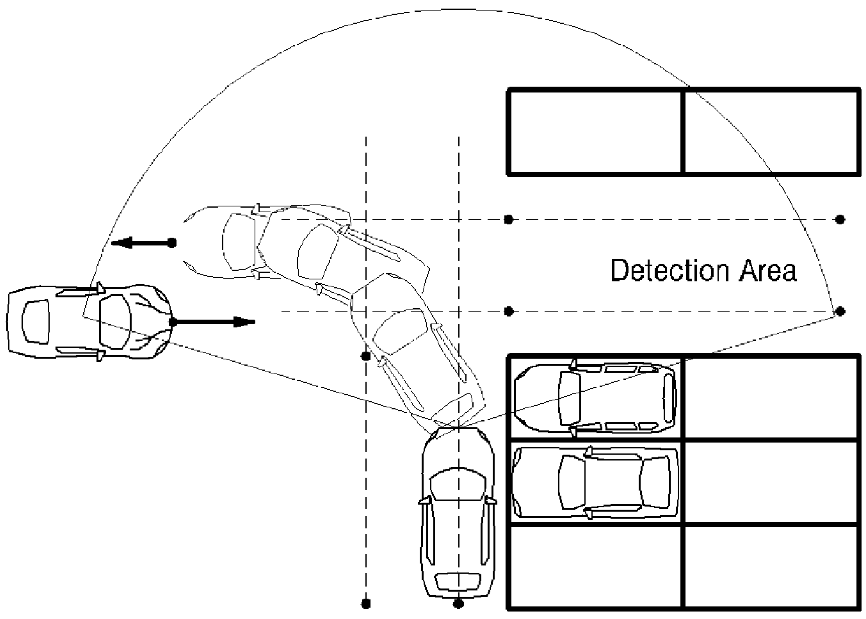
FIG. 1A and FIG. 1B are diagrams illustrating a vehicle stop considering a risk of collision with dynamic obstacles when a vehicle attempts to turn at an intersection.
Figure 1B:
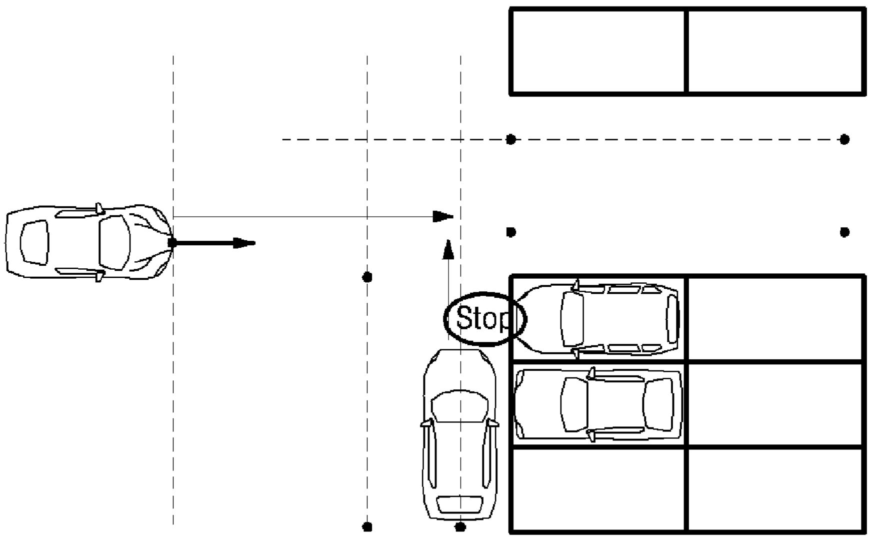

It may be understood that the appended drawings are not necessarily to scale, presenting a somewhat simplified representation of various features illustrative of the basic principles of the present disclosure. The specific design features of the present disclosure as included herein, including, for example, specific dimensions, orientations, locations, and shapes will be determined in part by the particularly intended application and use environment.

In the figures, reference numbers refer to the same or equivalent portions of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Hereinafter, various exemplary embodiments of the present disclosure will be described in detail with reference to the accompanying drawings. In the following description, like reference numerals designate like elements, although the elements are shown in different drawings. Furthermore, for clarity and for brevity, the following description of various exemplary embodiments will omit a detailed description of related known components and functions when considered obscuring the subject of the present disclosure.

Various ordinal numbers or alpha codes such as first, second, i), ii), a), b), etc., are prefixed solely to differentiate one component from the other but not to imply or suggest the substances, order, or sequence of the components. Throughout the present specification, when a part "includes" or "comprises" a component, the part is meant to further include other components, to not exclude thereof unless specifically stated to the contrary. The terms such as "unit," "module," and the like refer to units in which at least one function or operation is processed and they may be implemented by hardware, software, or a combination thereof.

The description of the present disclosure to be presented below in conjunction with the accompanying drawings is intended to describe exemplary embodiments of the present disclosure and is not intended to represent the only embodiments in which the technical idea of the present disclosure may be practiced.

The present disclosure relates to a method of determining whether an autonomous vehicle is allowed to traverse an intersection in a parking lot. The method includes determining whether the vehicle is allowed to traverse the intersection and a waiting time before entering the intersection, utilizing information related to the predicted travel position of the autonomous vehicle, travel time to the predicted travel position, and surrounding dynamic and static obstacles.

Basic definitions in the present disclosure are as follows.

First, static and dynamic obstacles observed in the vicinity of an intersection before entering the intersection are collectively defined as a risk group.

Second, the position and velocity values of the observed static/dynamic obstacles are not defined as single values but in a form of a Gaussian distribution considering sensor noise and observation errors.

Third, when passing through the intersection, the vehicle travels at a constant speed designated by the user.

In at least an exemplary embodiment of the present disclosure, to determine whether a vehicle is allowed to traverse at an intersection in a parking lot, the risk is evaluated based on a quantified occupancy probability result of a risk group around the predicted travel area of the vehicle, which is derived through a probability-based model considering performance indicators. Various exemplary embodiments of the present disclosure set the environmental information of the vehicle, select a collision risk assessment point, set a risk assessment zone, derive the occupancy probability of the risk group, and assess the risk to determine whether the vehicle is to stop before entering the intersection or traverse the intersection.

Figure 2A:
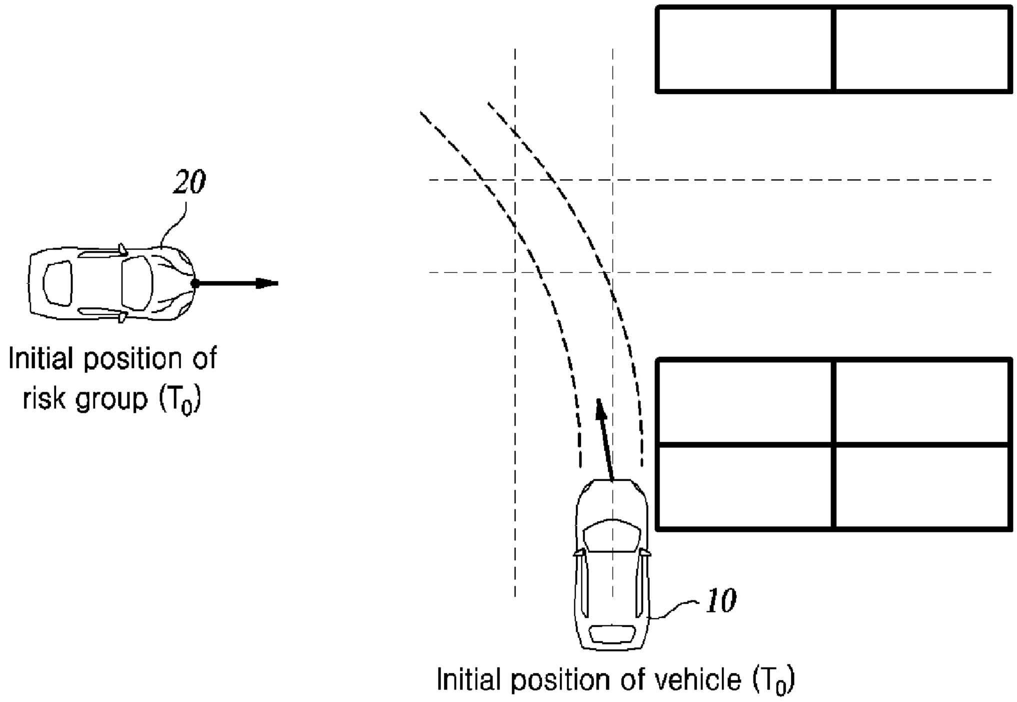
FIG. 2A and FIG. 2B are diagrams illustrating a risk assessment using occupancy probability before a vehicle enters an intersection, according to at least an exemplary embodiment of the present disclosure.
Figure 2B:
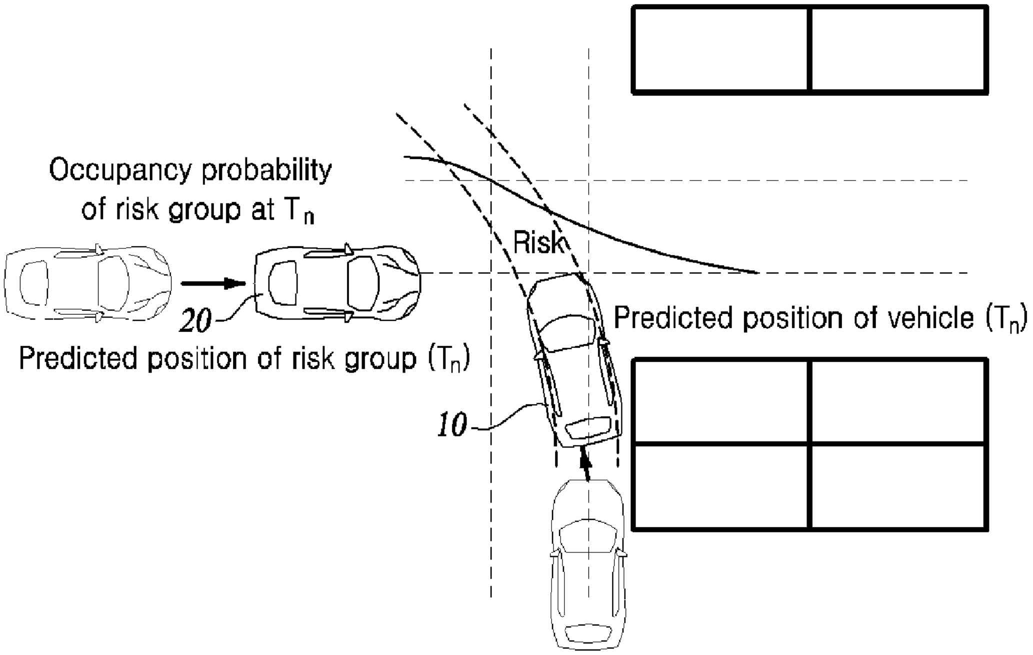

For example, as shown in FIG. 2A, a risk group 20 approaching the intersection may be detected at a time $T_0$ when a vehicle 10 attempts to enter an intersection in a parking lot. At the instant time, as shown in FIG. 2B, various exemplary embodiments of the present disclosure may derive an occupancy probability of the risk group 20 at a time $T_n$, evaluate the risk of collision between the vehicle 10 and the risk group 20 based on the occupancy probability, and determine whether the vehicle 10 should stop before entering the intersection or whether the vehicle 10 may traverse the intersection based on the evaluated risk.

Figure 3:
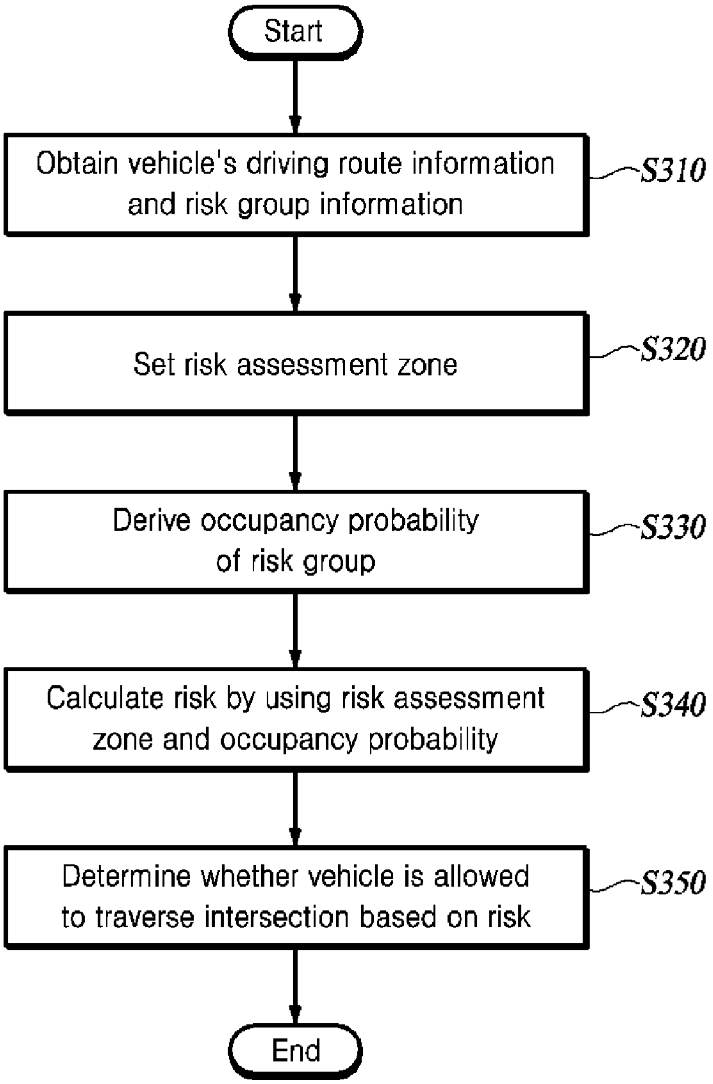
FIG. 3 is a flowchart of a method of assessing a risk of collision for traversing an intersection by an autonomous vehicle, according to at least an exemplary embodiment of the present disclosure.

FIG. 3 is a flowchart of a method of assessing a risk of collision for traversing an intersection by an autonomous vehicle, according to at least an exemplary embodiment of the present disclosure.

When a vehicle approaches the intersection within a threshold distance, or if the predicted time until the vehicle enters the intersection is less than or equal to a threshold time, the method of assessing a risk of collision for traversing an intersection by the vehicle is performed.

Referring to FIG. 3, in response to the vehicle approaching the intersection, the vehicle's driving route information and information on a risk group are obtained (S310).

The driving route information is a set of route points along which the vehicle will travel within the intersection, which includes the locations of the respective route points and predicted arrival times. For example, the driving route information may include the locations of a set of predicted driving route points $P_n$ (n=1, 2, . . . , N) along which the front center portion of the vehicle will travel and predicted arrival times $T_n$ (n=1, 2, . . . , N) of the predicted driving route points. The driving route information may be obtained through a route generation algorithm.

The information on the risk group includes at least one of location, direction, and velocity of surrounding dynamic and/or static obstacles in the detection area. Information on the risk group may be obtained through a sensor processing algorithm that processes sensor data detected using sensors (e.g., cameras, radio detection and ranging (RADAR), LiDAR, ultrasonic sensors, etc.) provided on the vehicle.

The velocity of the vehicle when traversing the intersection is fixed at the velocity preset by the user ($V_{user}$). The method may receives a velocity $V_{user}$ from the user through at one or more input/output interfaces (e.g., User Setting Mode of AVN), and preset the velocity of the vehicle when traversing the intersection as the velocity $V_{user}$. The input/output interface may be a means for interfacing with input/output devices. For example, input devices may include devices such as a vehicle AVN, a microphone, a keyboard, and mouse, and output devices may include devices such as a vehicle AVN, a display and a speaker. As an exemplary embodiment of the present disclosure, the input/output interface may be a means for interfacing with a device in which input and output functions are integrated, such as a touchscreen.

The method defines the initial position entering the intersection as $P_0$ and the predicted arrival time as $T_0$.

Using the driving route information of the vehicle 10 and the information on the risk group 20, the method includes setting a risk assessment zone within the intersection (S320). The method includes setting one or more node lines within the intersection area and sets a risk assessment zone by each node line. This is to evaluate the risk by selecting the risk assessment zone including the collision risk assessment points, because evaluating the risk for all the driving routes of the vehicles in the intersection would take a lot of computation.

Figure 4A:
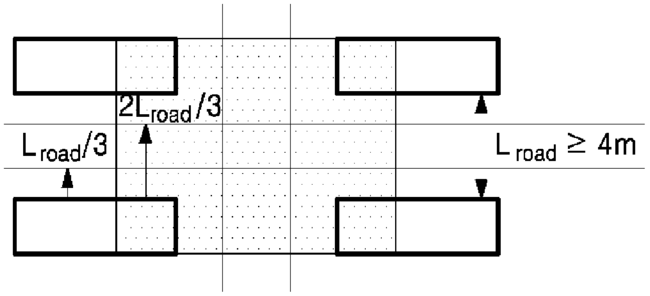
FIGS. 4A, 4B and 4C are diagrams illustrating node lines used to establish a risk assessment zone according to at least an exemplary embodiment of the present disclosure.
Figure 4B:
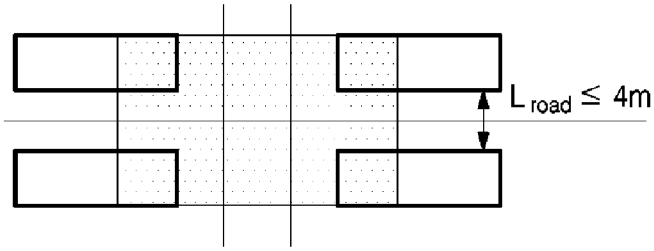

First, the method includes setting one or more node lines within the intersection area. A node line is a virtual line set on the road in the parking lot, and the number of node lines is determined by the width of the road. For example, if the road is at least 4 meters wide, the method may set two vertical and/or horizontal node lines that trisect the width of the road, as shown in FIG. 4A. For example, if the road is less than 4 meters wide, the method may set one vertical and/or horizontal node line that bisects the width of the road, as shown in FIG. 4B.

Figure 4C:
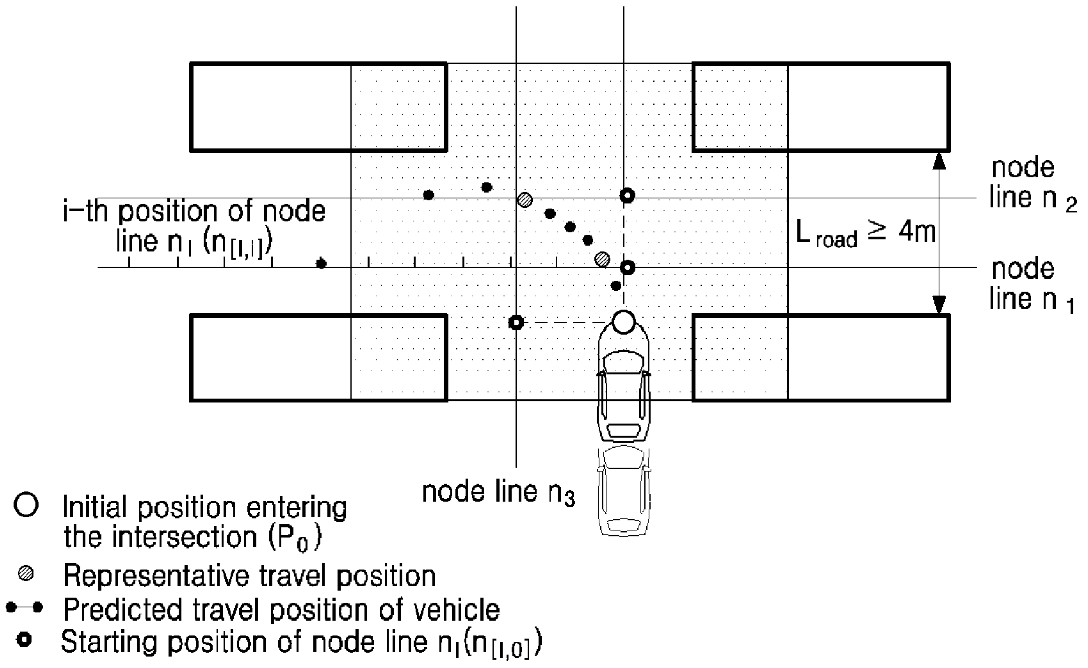

To quantify the occupancy probability of the risk group 20, the zone for each node line is subdivided into subzones. For each node line, the point closest to the initial point $P_0$ of the vehicle 10 entering the intersection is selected as the initial position ($n_{[1,0]}$), and then each node line is subdivided at intervals of a certain distance (e.g., 0.2 meters). The location of each subdivision for each node line is defined as $n_{[1,i]}$ (1=1, 2, . . . , 4, i=1, 2, . . . , M). Here, 1 means the index of each node line and i means the index of the location of the subdivisions of each node line. FIG. 4C illustrates, among four node lines, the subdivisions of a first node line $n_1$.

The method includes setting the risk assessment zone by each node line. The method selects a collision risk assessment point for each node line and establishes the risk assessment zone around the collision risk assessment point. Here, the collision risk assessment point is located on each node line and refers to a point for checking whether a collision with the risk group 20 possibly occurs when the vehicle 10 traverses the intersection. The collision risk assessment point is used to set the risk assessment zone among the subzones of each node line.

Figure 5A:
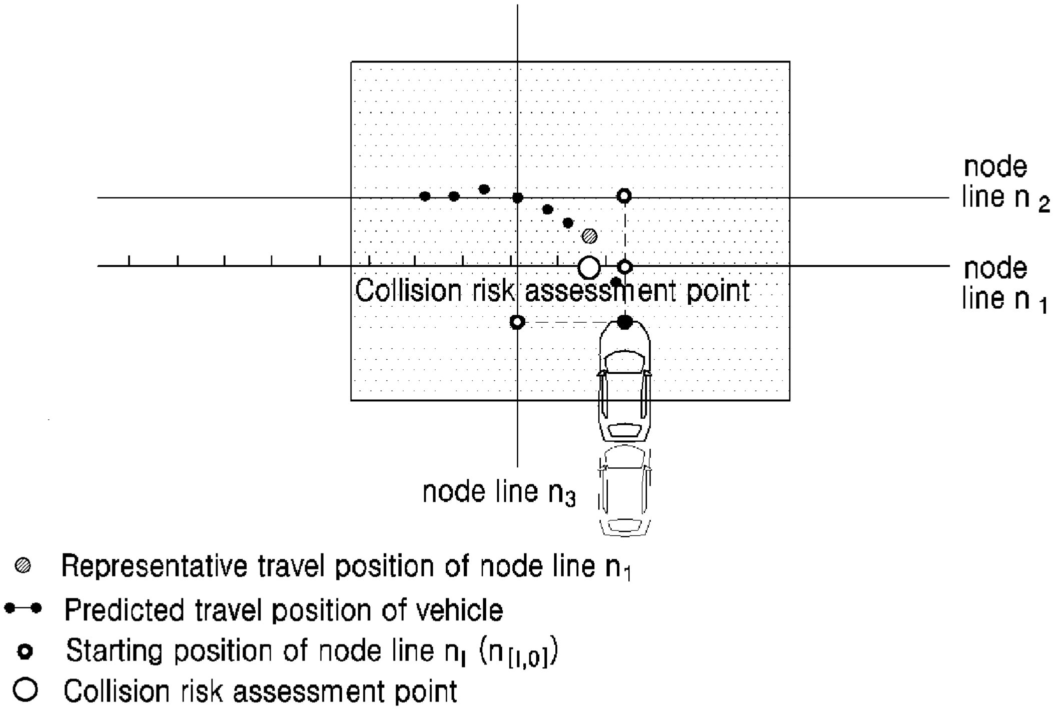
FIG. 5A and FIG. 5B are diagrams illustrating a collision risk assessment point by each node line and a risk assessment zone by each node line according to at least an exemplary embodiment of the present disclosure.

The method includes determining the collision risk assessment point based on the relationship between each node line $n_l$ lying in the intersection and the locations of the predicted driving route points $P_n$ of the vehicle 10. A representative driving route point is determined among the predicted driving route points of the vehicle 10 within the intersection, and a collision risk assessment point is determined based on the representative driving route point. For example, the method may include determining, among the predicted driving route points of the vehicle 10 within the intersection, a route point with the minimum distance ($d_{min}$) from each node line as the representative driving route point. For example, the method may include determining the collision risk assessment point by a contact point of a perpendicular line drawn from the representative driving route point, where the contact point meets with the corresponding node line. FIG. 5A shows an exemplary collision risk assessment point selected on the first node line $n_1$.

Figure 5B:
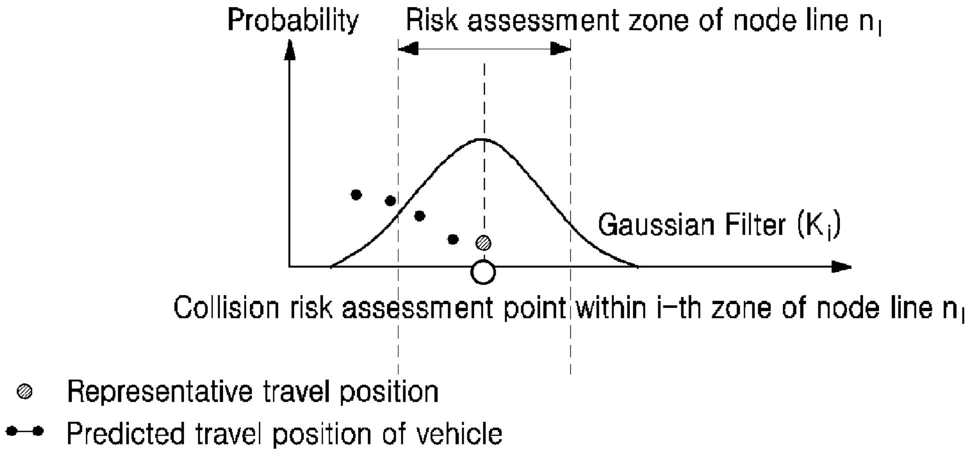

To represent the occupancy probability of the risk group 20, the method includes setting a risk assessment zone around the collision risk assessment point by each node line. In the instant case, the risk assessment zone is set as a Gaussian distribution around the collision risk assessment point. This is because a point-based judgment of the collision risk between a vehicle and a risk group at the predicted arrival time $T_n$ may cause misjudgment depending on the reliability of the sensor data. So, a probability-based risk assessment is applied to determine the collision risk more precisely. FIG. 5B shows an example risk assessment zone set on the first node line $n_1$.

The method may include defining the window size of the risk assessment zone as 2*m, where m is a variable user-settable value. In the instant case, weights in the corresponding window size include a Gaussian distribution $K_i$ as shown in Equation 1, and a degree of standard deviation $\sigma_{[1,i]}$ which may be derived from the user's predetermined vehicle velocity information. For example, the larger the predicted vehicle velocity $V_n$ at a representative driving route point, the lower standard deviation results.

$$K_i \sim N(n_{[l,i]}, \sigma_{[l,i]}) \quad \text{(Equation 1)}$$

$$\sigma_{[l,i]} = e^{(-(V_n - V_{max}))}$$

Herein, $V_{max}$ refers to the maximum velocity set by the user.

The method includes deriving the occupancy probability of the risk group by each node line (S330). The method includes representing the predicted occupancy position of the risk group for the time $T_n$ at which the vehicle travels to the representative driving route point, as a probability model. To find the predicted occupancy probability distribution at the time $T_n$, the method includes representing the initial occupancy position and velocity of the risk group as the probability model.

To derive the initial occupancy probability for each subzone by each node line with respect to each obstacle $O_j$ (j=1, 2, . . . ), the method include utilizing information on the risk group received at the initial position $P_0$ of the vehicle, i.e., information on at least one of the position, direction, and speed of each obstacle $O_j$. The initial occupancy probability in each subzone by each node line is expressed based on the correlation of the node line $n_1$ with the risk group.

The method includes deriving the initial occupancy probability of the risk group at the initial time $T_0$.

Figure 6A:
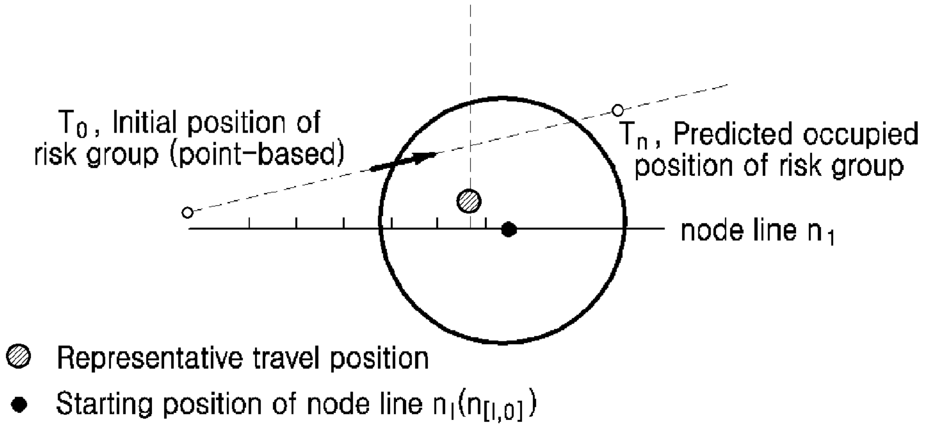
FIG. 6A and FIG. 6B are diagrams explaining a derivation of an initial occupancy probability of a risk group at time $T_0$ according to at least an exemplary embodiment of the present disclosure.

First, with the starting position $n_{[1,0]}$ of the node line $n_1$ set as the origin, a circle is drawn with a radius of the window size m of the risk assessment zone around the starting position $n_{[1,0]}$. If the predicted arrival position of the risk group is outside the circle at the predicted arrival time $T_n$, the initial occupancy probability of the risk group is set to 0. FIG. 6A shows an example setting of the initial occupancy probability to 0.

Figure 6B:
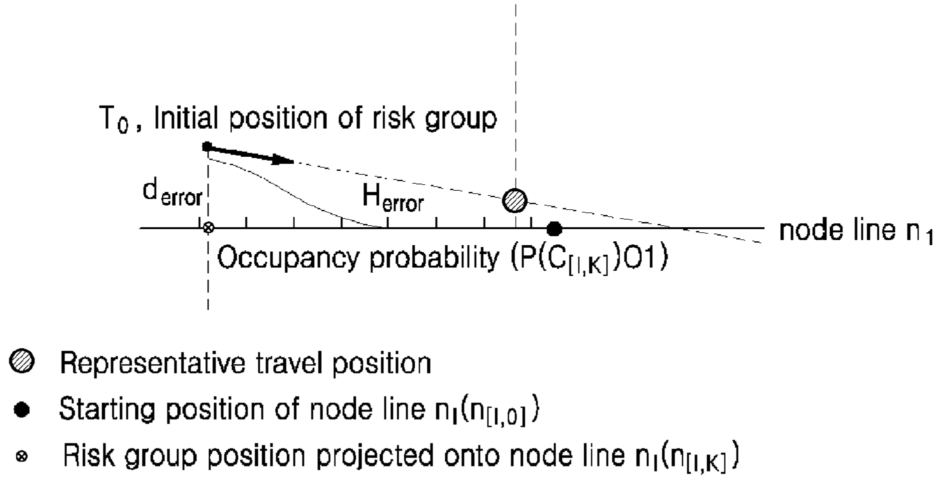

If the initial occupancy probability is non-zero, the method includes representing the initial occupancy probability based on how much the vertical distance of the risk group $O_1$ as projected on the K-th zone of the first node line $n_1$ is from the node line $n_1$ and how much a directional difference is between the risk group $O_1$ and the first node line $n_1$. Based on this, the initial occupancy probability is represented by a Gaussian distribution on the K-th zone of the first node line $n_1$. Representing the occupancy probability is exclusive to the direction of travel of the risk group. FIG. 6B shows an example derivation of the initial occupancy probability. The initial occupancy probability $$P(C_{[1\,K]})_{o_1}$$

of risk group $O_1$ may be determined as shown in Equation 2.

$$P(C_{[l,K]})_{o1} \sim N(n_{[l,K]}, \sigma_{[l,K]}) \quad \text{(Equation 2)}$$

$$\sigma_{[l,K]} = F_D(d_{error}) \times F_H(H_{error})$$

$$F_D(x) = \begin{cases} 0 & x > d_{Max} \\ 1 & x < d_{Min} \\ e^{\lambda_d(x - d_{Max})} & \text{other} \end{cases}$$

$$F_H(x) = \begin{cases} 0 & x > H_{Max} \\ 1 & x < H_{Min} \\ e^{\lambda_H(x - d_{Max})} & \text{other} \end{cases}$$

Here, $$P(C_{[1\,K]})_{o_1}$$

is the occupancy probability in the K-th zone of node line $n_1$ for risk group $O_1$, and $d_{Max}$, $d_{Min}$, $H_{Max}$, $H_{Min}$, $\lambda_d$, and $\lambda_H$ are user-specified values.

Furthermore, the method includes deriving the velocity distribution of the initial risk group for each node line. The velocity distribution is represented by a Gaussian distribution identical to the previously derived occupancy probability based on the observed velocity of the risk group, with the risk group's location (K-th zone) projected onto the node line n set as the starting point. The velocity distribution is used to find the predicted occupancy probability distribution after time $T_n$. The velocity distribution $(V_L)_{O_1}$ of risk group $O_1$ may be represented by Equation 3.

$$(V_L)_{o_1} \sim N\big((V_0)_{o_1}, \sigma_{[l,K]}\big) \quad \text{(Equation 3)}$$

Here, $(V_0)_{O_1}$ is the initial velocity of risk group $O_1$, and $\sigma_{[1,K]}$ is as described above in Equation 2.

The method includes deriving the occupancy probability of the risk group at time $T_n$.

Figure 7:
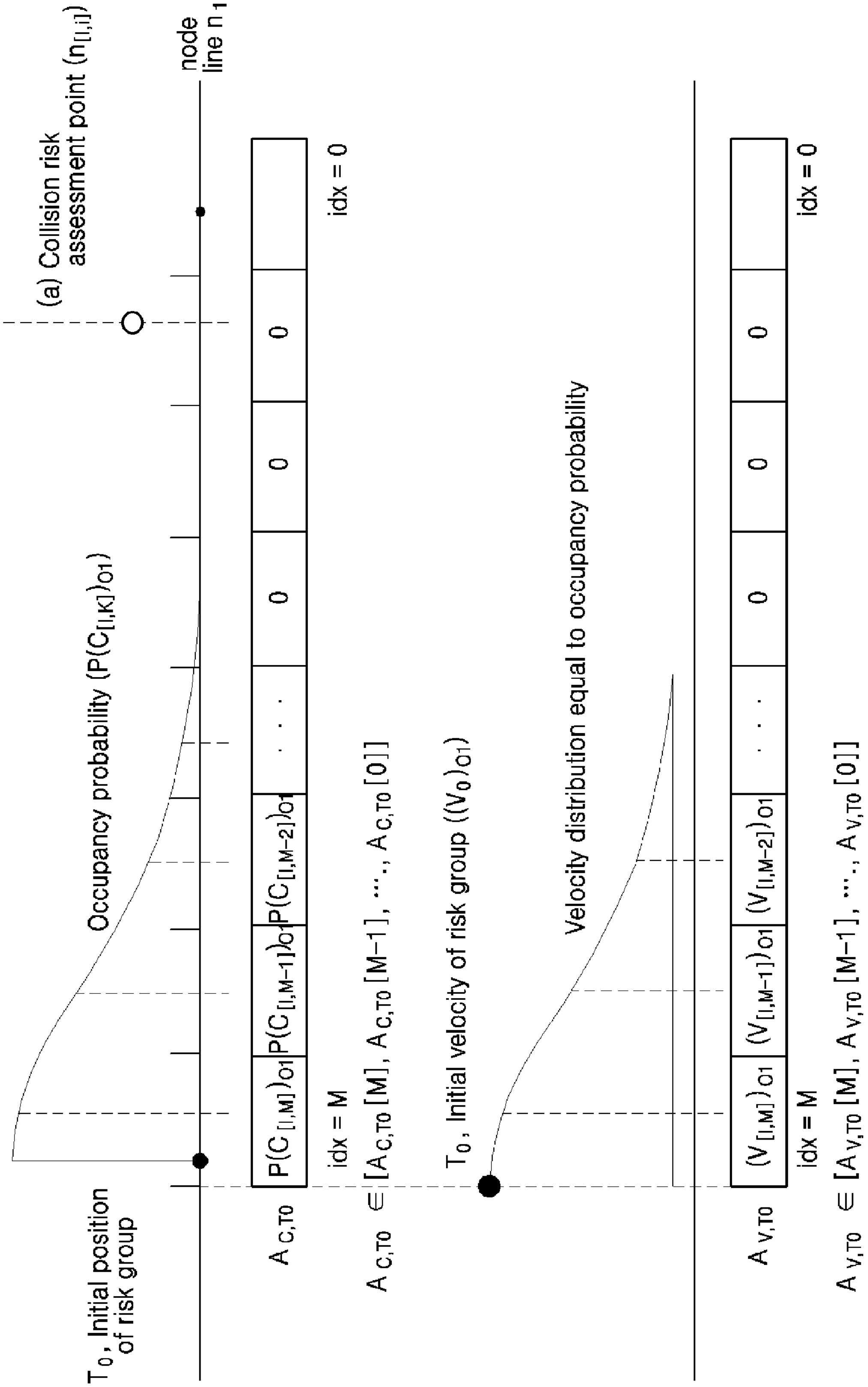
FIG. 7 is a diagram illustrating an occupancy probability array and a velocity information array of a risk group at time $T_0$ configured to derive an occupancy probability of the risk group at time $T_n$ according to at least an exemplary embodiment of the present disclosure.

To find the predicted occupancy probability distribution when time $T_n$ has elapsed, the method include utilizing the initial occupancy probability and velocity distribution information of each risk group, which are shown above. The method configures, relative to the starting position $n_{[0,1]}$ by each node line, an occupancy probability array ($A_{C,T_0}$) and a velocity information array ($A_{V,T_0}$) with columns equal to the length of the subzone, as shown in FIG. 7. The method includes updating the occupancy probability array ($A_{C,T_0}$) and the velocity information array ($A_{V,T_0}$) at intervals of a certain time (e.g., 0.2 seconds) to derive the occupancy probability of the risk group at time $T_n$.

By summing the occupancy probabilities for all obstacles, the method includes deriving the final occupancy probability of the risk group at each subzone for each node line. The final occupancy probability of the risk group is determined as shown in Equation 4.

$$P(C_{[l,K]}) = \sum_{obs=1}^{N} P(C_{[l,K]})_{O_{obs}} \quad \text{(Equation 4)}$$

Here, $P(C_{[1,K]})$ is the final occupancy probability of the risk group, and $$P(C_{[l,K]})_{O_{obs}}$$

is the occupancy probability of each obstacle $O_{obs}$ in the K-th zone of the node line $n_1$ The method includes determining the risk by use of the risk assessment zone and the final occupancy probability of the risk group by each node line (S340). The method may include determining the final risk for each node line by use of the risk assessment zone set in Step S320 and weights and the final occupancy probability of the risk group by each node line at time $T_n$. For example, the final risk for each node line may be determined as shown in Equation 5.

$$P_{Risk} = \sum_{2m} P(C_l) \cdot K_i \quad \text{(Equation 5)}$$

Here, $P_{Risk}$ is the final risk of the 1-th node line, $P(C_1)$ is the final occupancy probability of the risk group on the l-th node line, and $K_i$ is the weight of the risk assessment zone.

The collision risk for each node line may be evaluated based on the vehicle's speed and predicted arrival time at the representative driving route point corresponding to the risk assessment zone by each node line.

Based on the risk, the method includes determining whether the vehicle is allowed to traverse the intersection (S350). The method may use the final risk $P_{Risk}$ determined by each node line to determine whether the intersection is clear for the vehicle to traverse.

For example, if the final risk for each of all node lines is 0.2 or less, the intersection may be determined to be traversable for the vehicle. In the instant case, the method may inform the user that the intersection is traversable, and control the vehicle to traverse the intersection. The method may generate responsive data indicating that the intersection is traversable, in response to the intersection being determined to be traversable. The responsive data may be at least one of audio data, image data, or text data. The method may output, at one or more output devices (e.g., a speaker, a display, an AVN), the responsive data to the user.

For example, if the final risk for at least one node line is greater than 0.2, the method may include determining that a collision between the vehicle and the risk group may occur to stop the vehicle and repeat Steps S310 through S340. The method may stop the vehicle by reducing the vehicle velocity at a preset deceleration rate. The method may stop the vehicle using a brake control system such as autonomous emergency braking system, collision avoidance system, etc. Until the final risk for each of all node lines is 0.2 or less, the method may include keeping the vehicle stopped. At the present point, the method may inform the user that the intersection is not traversable. The method may generate responsive data indicating that the intersection is not traversable, in response to determining that a collision between the vehicle and the risk group may occur. The responsive data may be at least one of audio data, image data, or text data. The method may output, at one or more output devices (e.g., a speaker, a display, an AVN), the responsive data to the user.

For example, if the sum of the final risks for the respective node lines is greater than or equal to 1, the method may include determining that a collision may occur between the vehicle and the risk group to stop the vehicle and repeat Steps S310 through S340. The method may stop the vehicle by reducing the vehicle velocity at a preset deceleration rate. The method may stop the vehicle using a brake control system such as autonomous emergency braking system, collision avoidance system, etc. Until the final risk for each of all node lines is 0.2 or less, the method may include keeping the vehicle stopped. At the present point, the method may inform the user that the intersection is not traversable. The method may generate responsive data indicating that the intersection is not traversable, in response to determining that a collision between the vehicle and the risk group may occur. The responsive data may be at least one of audio data, image data, or text data. The method may output, at one or more output devices (e.g., a speaker, a display, an AVN), the responsive data to the user.

At least some of the components described in the exemplary embodiments of the present disclosure may be implemented as hardware elements including at least one or a combination of a digital signal processor (DSP), a processor, a controller, an application-specific IC (ASIC), a programmable logic device (FPGA, etc.), and other electronic devices. Furthermore, at least some of the functions or processes described in the exemplary embodiments of the present disclosure may be implemented as software, and the software may be stored in a recording medium. At least some of the components, functions, and processes described in the exemplary embodiments of the present disclosure may be implemented through a combination of hardware and software.

The methods according to the exemplary embodiments of the present disclosure may be written as a program which may be executed on a computer, and may also be implemented in various recording mediums such as a magnetic storage medium, an optical read medium, and a digital storage medium.

Implementations of the various techniques described herein may be realized by digital electronic circuitry, or by computer hardware, firmware, software, or combinations thereof. Implementations may be made as a computer program tangibly embodied in a computer program product, i.e., an information carrier, e.g., machine-readable storage device (computer-readable medium) or a radio signal, for processing by, or controlling the operation of a data processing device, e.g., a programmable processor, a computer, or multiple computers. Computer programs, such as the computer program(s) described above, may be written in any form of programming language, including compiled or interpreted languages, and may be deployed in any form as a stand-alone program or as a module, component, subroutine, or other units suitable for use in a computing environment. The computer program may be processed on one computer or multiple computers at one site or distributed across multiple sites and developed to be interconnected through a communications network.

Processors suitable for processing computer programs include, by way of example, both and special-purpose microprocessors, and any one or more processors of any type of digital computer. Typically, a processor will receive instructions and data from read-only memory or random access memory, or both. Elements of the computer may include at least one processor that executes instructions and one or more memory devices that store instructions and data. In general, the computer may include one or more mass storage devices that store data, such as magnetic disks, magneto-optical disks, or optical disks, or may be coupled to the mass storage devices to receive data therefrom and/or transmit data thereto. Information carriers suitable for embodying computer program instructions and data include, for example, semiconductor memory devices, magnetic mediums such as hard disks, floppy disks, and magnetic tapes, optical mediums such as CD-ROM (Compact Disk Read Only Memory), DVD (Digital Video Disk), magneto-optical mediums such as floptical disk, Read-Only Memory (ROM), Random Access Memory (RAM), flash memory, Erasable Programmable ROM (EPROM), and Electrically Erasable Programmable ROM (EEPROM). The processor and memory may be supplemented by or included in special purpose logic circuitry.

The processor may execute an operating system and software applications executed on the operating system. Furthermore, the processor device may access, store, manipulate, process, and generate data in response to the execution of software. For ease of understanding, the processor device may be referred to as being used as a single processor device, but those skilled in the art will understand that the processor device may include a plurality of processing elements and/or a plurality of types of processing elements. For example, a processor device may include a plurality of processors or one processor, and one controller. Furthermore, other processing configurations, such as parallel processors, are also possible.

Furthermore, a non-transitory computer-readable medium may be any available medium which may be accessed by a computer and may include both a computer storage medium and a transmission medium.

The present specification includes details of a number of specific implements, but it should be understood that the details do not limit any invention or what is claimable in the specification but rather describe features of the specific example embodiment. Features described in the specification in the context of individual example embodiments may be implemented as a combination in a single example embodiment. In contrast, various features described in the specification in the context of a single exemplary embodiment of the present disclosure may be implemented in multiple example embodiments individually or in an appropriate sub-combination. Furthermore, the features may operate in a specific combination and may be initially described as claimed in the combination, but one or more features may be excluded from the claimed combination in some cases, and the claimed combination may be changed into a sub-combination or a modification of a sub-combination.

Similarly, even though operations are described in a specific order on the drawings, it should not be understood as the operations needing to be performed in the specific order or in sequence to obtain desired results or as all the operations needing to be performed. In a specific case, multitasking and parallel processing may be advantageous. Furthermore, it should not be understood as requiring a separation of various apparatus components in the above described example embodiments in all example embodiments, and it should be understood that the above-described program components and apparatuses may be incorporated into a single software product or may be packaged in multiple software products.

It should be understood that the example embodiments included herein are merely illustrative and are not intended to limit the scope of the present disclosure. It will be apparent to one of ordinary skill in the art that various modifications of the example embodiments may be made without departing from the spirit and scope of the claims and their equivalents.

Furthermore, the terms such as “unit”, “module”, etc. included in the specification mean units for processing at least one function or operation, which may be implemented by hardware, software, or a combination thereof.

In the flowchart described with reference to the drawings, the flowchart may be performed by the controller or the processor. The order of operations in the flowchart may be changed, multiple operations may be merged, or any operation may be divided, and a specific operation may not be performed. Furthermore, the operations in the flowchart may be performed sequentially, but not necessarily performed sequentially. For example, the order of the operations may be changed, and at least two operations may be performed in parallel.

Hereinafter, the fact that pieces of hardware are coupled operably may include the fact that a direct and/or indirect connection between the pieces of hardware is established by wired and/or wirelessly.

In an exemplary embodiment of the present disclosure, the vehicle may be referred to as being based on a concept including various means of transportation. In some cases, the vehicle may be interpreted as being based on a concept including not only various means of land transportation, such as cars, motorcycles, trucks, and buses, that drive on roads but also various means of transportation such as airplanes, drones, ships, etc.

For convenience in explanation and accurate definition in the appended claims, the terms “upper”, “lower”, “inner”, “outer”, “up”, “down”, “upwards”, “downwards”, “front”, “rear”, “back”, “inside”, “outside”, “inwardly”, “outwardly”, “interior”, “exterior”, “internal”, “external”, “forwards”, and “backwards” are used to describe features of the exemplary embodiments with reference to the positions of such features as displayed in the figures. It will be further understood that the term “connect” or its derivatives refer both to direct and indirect connection.

The term “and/or” may include a combination of a plurality of related listed items or any of a plurality of related listed items. For example, “A and/or B” includes all three cases such as “A”, “B”, and “A and B”.

In exemplary embodiments of the present disclosure, “at least one of A and B” may refer to “at least one of A or B” or “at least one of combinations of at least one of A and B”. Furthermore, “one or more of A and B” may refer to “one or more of A or B” or “one or more of combinations of one or more of A and B”.

In the present specification, unless stated otherwise, a singular expression includes a plural expression unless the context clearly indicates otherwise.

In the exemplary embodiment of the present disclosure, it should be understood that a term such as “include” or “have” is directed to designate that the features, numbers, steps, operations, elements, parts, or combinations thereof described in the specification are present, and does not preclude the possibility of addition or presence of one or more other features, numbers, steps, operations, elements, parts, or combinations thereof.

According to an exemplary embodiment of the present disclosure, components may be combined with each other to be implemented as one, or some components may be omitted.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described in order to explain certain principles of the invention and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A computer-implemented method of assessing a risk of collision for traversing an intersection by an autonomous vehicle, the method comprising:

obtaining, by a processor, in response to the autonomous vehicle approaching the intersection, driving route information of the autonomous vehicle and information on a risk group, wherein the driving route information includes a location and a predicted arrival time of each of route points for the autonomous vehicle to travel along, and the information on the risk group includes at least one of a location, a direction, or a velocity of surrounding obstacles, and wherein the processor obtains the information on the risk group based on sensor data detected by at least one sensor of the autonomous vehicle;

setting at least one node line within the intersection, and setting a risk assessment zone by each node line;

wherein the setting of the risk assessment zone includes, for each node line, determining a representative driving route point among the route points for the autonomous vehicle to travel along within the intersection based on a closest distance to the node line, determining a collision risk assessment point on the node line as a contact point of a perpendicular line drawn from the representative driving route point, where the contact point meets with the node line, and setting a risk assessment zone of a predetermined size based on the collision risk assessment point;

deriving, by the processor, an occupancy probability of the risk group;

determining, by the processor, a collision risk between the autonomous vehicle and the risk group by use of the risk assessment zone and the occupancy probability; and determining, by the processor, based on the collision risk, whether the autonomous vehicle is allowed to traverse the intersection; and controlling, by the processor, movement of the autonomous vehicle to traverse the intersection or stop at the intersection based on whether the autonomous vehicle is allowed to traverse the intersection.

2. The method of claim 1, wherein the obtaining of the driving route information and the information on the risk group includes:

obtaining the driving route information of the autonomous vehicle and the information on the risk group in response that the autonomous vehicle approaches the intersection within a threshold distance, or in response that an estimated time of the autonomous vehicle entering the intersection is less than or equal to a threshold time.

3. The method of claim 1, wherein the setting of the risk assessment zone includes:

subdividing a zone for each node line into subzones.

4. The method of claim 1, wherein weights at the risk assessment zone by each node line have a Gaussian distribution.

5. The method of claim 1, wherein the deriving of the occupancy probability of the risk group includes:

deriving an occupancy probability by each node line for each of the obstacles by use of the information on the risk group; and deriving a final occupancy probability of the risk group by each node line by summing derived occupancy probabilities by respective node lines for all the obstacles.

6. The method of claim 5, wherein the deriving of the occupancy probability by each node line for each of the obstacles including:

deriving an initial occupancy probability for each of the obstacles; and deriving the occupancy probability by each node line for each of the obstacles at a predicted arrival time at a representative driving route point of the autonomous vehicle based on the initial occupancy probability by each of the obstacles.

7. The method of claim 5, wherein the determining of the collision risk includes:

determining a risk by each node line based on the risk assessment zone by each node line and the final occupancy probability of the risk group by each node line.

8. The method of claim 7, wherein the determining of whether the autonomous vehicle is allowed to traverse the intersection includes:

determining whether the intersection is clear for the autonomous vehicle to traverse based on the determined risk by each node line.

9. The method of claim 8, wherein the determining of whether the autonomous vehicle is allowed to traverse the intersection comprises:

determining that the intersection is clear for the autonomous vehicle to traverse in response that determined risks by all the node lines are below a threshold value.

10. A non-transitory computer readable storage medium on which a program for performing the method of claim 1 is recorded.

11. An apparatus of assessing a risk of collision for traversing an intersection by an autonomous vehicle, the apparatus comprising:

at least one processor; and a memory operatively coupled to the at least one processor, wherein the memory stores instructions that cause the at least one processor to perform operations in response to an execution of the instructions by the at least one processor, and wherein the operations include:

obtaining, in response to the autonomous vehicle approaching the intersection, driving route information of the autonomous vehicle and information on a risk group, wherein the driving route information includes a location and a predicted arrival time of each of route points for the autonomous vehicle to travel along, and the information on the risk group includes at least one of a location, a direction, or a velocity of surrounding obstacles, and wherein the at least one processor obtains the information on the risk group based on sensor data detected by at least one sensor of the autonomous vehicle; and setting at least one node line within the intersection, and setting a risk assessment zone by each node line;

wherein the setting of the risk assessment zone includes, for each node line, determining a representative driving route point among the route points for the autonomous vehicle to travel along within the intersection based on a closest distance to the node line, determining a collision risk assessment point on the node line as a contact point of a perpendicular line drawn from the representative driving route point, where the contact point meets with the node line, and setting a risk assessment zone of a predetermined size based on the collision risk assessment point;

deriving an occupancy probability of the risk group;

determining a collision risk between the autonomous vehicle and the risk group by use of the risk assessment zone and the occupancy probability;

determining, based on the collision risk, whether the autonomous vehicle is allowed to traverse the intersection; and controlling movement of the autonomous vehicle to traverse the intersection or stop at the intersection based on whether the autonomous vehicle is allowed to traverse the intersection.

12. The apparatus of claim 11, wherein the setting of the risk assessment zone includes:

subdividing a zone for each node line into subzones.

13. The apparatus of claim 11, wherein the deriving of the occupancy probability of the risk group includes:

deriving an occupancy probability by each node line for each of the obstacles by use of the information on the risk group; and deriving a final occupancy probability of the risk group by each node line by summing derived occupancy probabilities by respective node lines for all the obstacles.

14. The apparatus of claim 13, wherein the determining of the collision risk includes:

determining a risk by each node line based on the risk assessment zone by each node line and the final occupancy probability of the risk group by each node line.

15. The apparatus of claim 14, wherein the determining of whether the autonomous vehicle is allowed to traverse the intersection includes:

determining whether the intersection is clear for the autonomous vehicle to traverse based on the determined risk by each node line.

* * * * *